United States Patent [19]

Fava

[11] 4,284,735

[45] Aug. 18, 1981

[54] POLYPHENYLENE OXIDE BLEND WITH RUBBER-MALEIMIDE-STYRENE COPOLYMER

[75] Inventor: Ronald A. Fava, Monroeville, Pa.

[73] Assignee: Arco Polymers, Inc., Philadelphia, Pa.

[21] Appl. No.: 162,000

[22] Filed: Jun. 23, 1980

[51] Int. Cl.³ ............................................. C08L 53/00
[52] U.S. Cl. .......................................... 525/93; 525/91
[58] Field of Search ............................... 525/92, 93, 91

[56] References Cited

U.S. PATENT DOCUMENTS 4,097,550   6/1978   Haaf ....................................... 525/92

Primary Examiner—J. Ziegler
Attorney, Agent, or Firm—John R. Ewbank

[57] ABSTRACT

An advantageous blend suitable for the molding of plastic articles is prepared by mechanically mixing a polyphenylene ether resin and a resin prepared by conducting the polymerization of a mixture of a rubber, maleimide, and styrene.

2 Claims, No Drawings

POLYPHENYLENE OXIDE BLEND WITH RUBBER-MALEIMIDE-STYRENE COPOLYMER

RELATED APPLICATIONS

Reference is made to the concurrently filed application of Ronald Fava, Ser. No. 161,806 filed June 23, 1980 concerned with blends of maleimide styrene and polyphenylene oxide, all the disclosure of said related application being deemed here reiterated and incorporated herein.

BACKGROUND OF THE INVENTION

The invention relates to thermoplastic molding compositions having an advantageous combination of properties.

PRIOR ART

Haaf et al U.S. Pat. No. 4,097,550 describes a thermoplastic molding composition comprising polyphenylene ether resin and a resin resulting from co-polymerization of a rubbery component, styrene, and a maleic anhydride.

Lee U.S. Pat. No. 4,113,797 describes a blend of polyphenylene ether resin with a block copolymer of a vinyl aromatic compound in a conjugated diene and a rubber modified copolymer of styrene maleic anhydride.

Abolenes et al U.S. Pat. No. 4,131,598 describes a blend which features polyphenylene oxide resin and a copolymer of styrene and maleic anhydride.

Fava U.S. Pat. No. 4,122,130 describes a blend of a polycarbonate and a copolymer comprising rubber, maleimide, and styrene.

Di Giulio U.S. Pat. No. 3,998,907 describes the preparation of resins comprising maleimide from the corresponding resins derived from maleic anhydride precursor by subjecting the maleic anhydride resin to ammonia or primary amine. Maleimide has been prepared from maleic anhydride and ammonia or primary amine. Such maleimide is suitable for copolymerization with styrene or other vinyl aromatic compounds.

SUMMARY OF THE INVENTION

In accordance with the present invention an advantageous alloy of plastics is prepared by heating, stirring, and subjecting to pressure for blending a polyphenylene oxide resin and a resin which is a copolymer of styrene, rubber, and maleimide.

DETAILED DESCRIPTION OF THE INVENTION

Butadiene and styrene are copolymerized using butyl lithium as the catalyst to provide a solution of a block polymer containing about 15% styrene and about 85% butadiene. A rubbery block copolymer marketed by Firestone as Stereon 720 is suitable as said block polymer and can be dissolved in xylene to provide a solution of rubber. Styrene, and the maleic components are added to such solution and subjected to interpolymerization to provide a product containing about 13% butadiene, about 7% maleic component and about 80% styrene. It is sometimes convenient to use methyl amine to convert maleic anhydride to the methyl-maleic imide, and to use such alkylated maleic imide as the maleic component. Ammonia can be used to convert maleic anhydride to maleimide for use in said interpolymerization step. If maleic anhydride is employed in the interpolymerization step, then hot treatment of the polymer with ammonia in accordance with the procedure of Di Guilio U.S. Pat. No. 3,998,907 is necessary. The rubber modified styrene-maleimide resins, whichever method of preparation, has a composition corresponding to about 13% butadiene, about 7% maleimide, and about 80% styrene. Such resin is prepared as pellets suitable as feedstock for an extruder.

A rubber blending mill is employed to masticate, intimately mix, and stir a hot plastic mixture of a plurality of varieties of plastic resin pellets. Substantially all of the attempts to blend plastics are failures because the solubility of one plastic resin in another plastic resin is a rare phenomenon. However, it is discovered in accordance with the present invention, that rubbermodified styreneimide is soluble in polyphenylene oxide. Moreover, the blend can be transferred to an extruder to produce pellets suitable for molding articles having an advantageous combination of properties.

Some of the characteristics of polyphenylene oxide, of rubber-modified styrene maleimide, and of articles prepared from the pellets of such 50/50% blend are shown:

| Component | Izod (ft. lb/inch) | Vicat (°F.) | Flexural Modulus ($10^3$ psi) | Flexural Strength (psi) |
|---|---|---|---|---|
| PPO | 1.2 | 420 | NA | NA |
| Maleimide styrene | 1.4 | 258 | 296 | 7,300 |
| 50/50 blend | 1.8 | 337 | 249 | 13,600 |

Because the Vicat temperature for the blend was 79° F. higher than for the maleimide-styrene resin, the superior ability to withstand hot environment enhances the usefulness of the blend. Conventional equipment can be employed in converting the pellets of the blend into plastic articles because the Vicat temperature is 162° F. less than that for PPO.

The blend has a combination of properties which is advantageous in making articles from the blend. Significant advantages accrue from preparing blends having a composition range from 35% to 65% of each of said components, that is 50±15% for each component. Moreover, the impact resistance of articles containing only 35% of the styrene-maleimide resin is sufficiently superior to products completely free from rubber to provide distinct markets for the rubber-containing blend.

Various modifications are possible without departing from the scope of the appended claims.

The invention claimed is:

1. A thermoplastic molding composition which comprises:
   A. about (50±15)% polyphenylene oxide.
   B. about (50±15)% interpolymer of three components
   (aa) a rubbery block copolymer prepared using a butyl lithium catalyst from 5 to 35% vinyl aromatic compound and from 65 to 95% conjugated alkyldiene, said rubbery block copolymer constituting from 5% to 35% of the interpolymer of three components;
   (bb) maleimide constituting from 5% to 35% of the interpolymer of three components; and
   (cc) styrene constituting from 60% to 90% of the interpolymer of three components.
2. The thermoplastic molding composition of claim 1 in which:
   A. the quantity of polyphenylene oxide is about 50%
   B. the quantity of interpolymer of three components is about 50%, said interpolymer featuring
   (aa) about 13% butadiene
   (bb) about 7% maleimide; and
   (cc) about 80% styrene.

* * * * *